Aug. 14, 1956    R. FUCHS ET AL    2,758,471
HARDNESS TESTING AND MEASURING DEVICE
Filed July 7, 1953    3 Sheets-Sheet 1

INVENTORS
RICHARD FUCHS
OSKAR POSCH

BY
ATTORNEY

Aug. 14, 1956   R. FUCHS ET AL   2,758,471
HARDNESS TESTING AND MEASURING DEVICE
Filed July 7, 1953   3 Sheets-Sheet 2
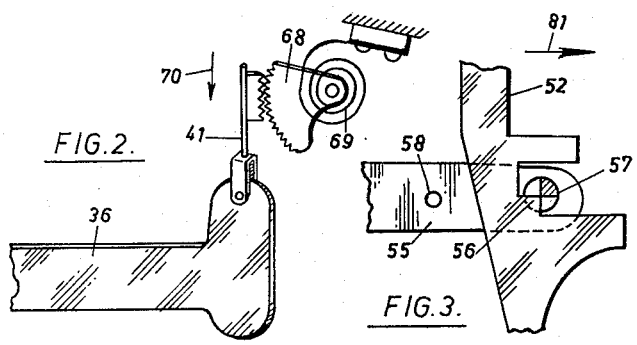
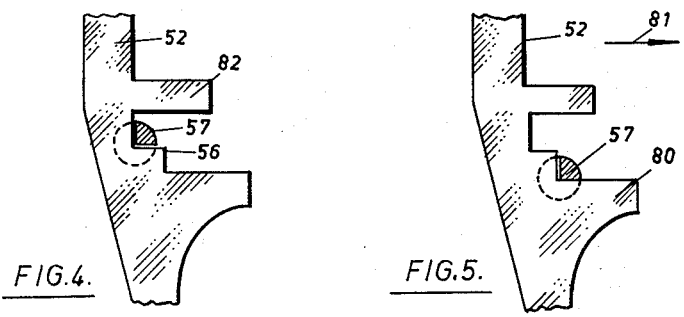
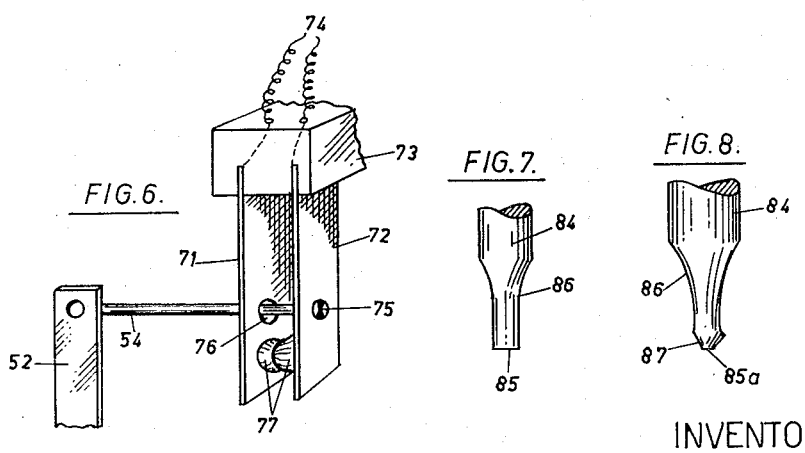
INVENTORS
RICHARD FUCHS
OSKAR POSCH
BY
ATTORNEY Aug. 14, 1956    R. FUCHS ET AL    2,758,471
HARDNESS TESTING AND MEASURING DEVICE
Filed July 7, 1953    3 Sheets-Sheet 3

INVENTORS
RICHARD FUCHS
OSKAR POSCH
BY
ATTORNEY

United States Patent Office 2,758,471
Patented Aug. 14, 1956

2,758,471

HARDNESS TESTING AND MEASURING DEVICE

Richard Fuchs, Ransbach, Westerwald, and Oskar Posch, Schwabisch Gmünd, Germany, assignors to Peter Fuchs Erste Naxosschmirgelfabrik Deutschlands, Ransbach, Westerwald, Germany Application July 7, 1953, Serial No. 366,524

Claims priority, application Germany July 10, 1952

16 Claims. (Cl. 73—78)

This invention relates to a device for determining the hardness of ceramic or artificial compound materials. It may be used, for example, in testing the hardness of grinding wheels, bricks, plaster, floors, pavements, and the like, and is of the kind in which a chisel-shaped tool is adapted to penetrate into the material to be tested and, simultaneously to perform a reciprocatory and, preferably, also a turning or rotary movement.

The main object of the invention is the provision of a handy contrivance or implement of the described character, which may be in the shape, for example, of a hand drilling machine, a pneumatic hammer, or the like, and can be fixed or suspended from a tripod or other stand, and by means of which absolutely reliable readings can be obtained independent of the nature of the material being tested.

Another object of the invention is the provision of a device of the described character which will permit accurate determination of the structural strength of materials of the class referred to, and particularly of such materials in which the adhesion of the particles depends on the use of synthetic binders of any description.

The solids which are particularly adapted for testing by a device in accordance with this invention are of a class which is not so much of a brittle but more of a tough nature, which involves the risk that the penetration of the chisel into the material will not destroy its structure, but will simply dislodge or compress and thereby wedge the particles firmly together.

A further object of the invention resides in the employment of particularly defined materials for the chisel in as much as, besides steel, other materials may be used, such as sintered carborundum and other highly resistant materials. Again, the shape of the chisel is to be such as will permit an easy and precise penetration into the material being tested, which is an indispensable requirement for obtaining reliable results. The shape of the chisel, in accordance with the invention, is such as will prevent the formation, in the centre of the drill hole of the tested material, of a circular pressure area of large diameter by the combined pounding and turning movement of the tool, as such surface would be subjected to pressure only.

Another one of the more important objects of the invention is the measuring of the depth to which the chisel penetrates into the material, which is achieved by keeping the depth of penetration constant and by the employment of a suitable control which stops or disconnects the machine when a predetermined depth has been reached. By maintaining the load on the tool or chisel at a constant value during the operation of the device, and by counting the number of strokes of the tool required to produce the predetermined depth of penetration thereof into the tested material, it is possible to determine the work performed by the device in effecting such penetration, and thereby to determine the relative hardness of the tested material.

Still another object is the provision of a device in accordance with the invention which shall be capable of working at comparatively high speed so as to enable the carrying out of a large number of tests in a short time and to obtain exact plots of the hardness lines in a work piece.

With these and other objects in view the invention consists in the provision of a hardness testing and measuring device having a reciprocating and simultaneously revolving chisel for penetrating into the material to be tested. The chisel is supported in a holder which is capable of sliding and turning movement and which constitutes one of at least two mutually connected movable masses (in a physical sense) within a housing, while the other mass may be constituted, for example, by a balance beam-like contrivance. The invention, however, also includes the employment of other masses for the purpose, such, for instance, as gear parts and others. The connection between these masses is preferably devised in such way as to cause them to carry out mutually opposing movements during the test, which means that, when the chisel penetrates into the material, the mass of the chisel holder will follow for example in a downward direction while at the same time the other mass, for instance the balance beam device, to which additional weights may be added, moves upwards. In this way a compensation of the moving masses is obtained so that the implement may be employed in any position desired. It may be attached to a stand so as to act downwardly, or held in a horizontal position as might be required when testing the hardness of wall material, or inverted, as for example in the testing of ceiling material in buildings.

In order to advance the chisel during its combined reciprocal and rotary movement, the invention provides means suitable to impart to the chisel holder a force in the direction of penetration of the chisel. If the contrivance, when in use, depends from a tripod or stand, the penetration producing means may be constituted for example by the weight of the device itself. For use in other working positions, the example hereinafter described includes a spring arrangement which by reason of its particular construction provides a pressure upon the chisel holder in the direction of penetration and that remains uniform during penetration.

The above, and other objects, features and advantages of the invention, will be apparent from the accompanying sheets of drawings which illustrate a preferred embodiment of the invention. It is to be understood, however, that the invention is not intended to be limited by the example shown and described, but that various alterations to suit convenience or requirements may be resorted to without thereby departing from the spirit of the invention.

In the drawings:

Fig. 2 is a detail view of an assembly included in the device embodying the invention, but not shown on Fig. 1.

Figs. 3 to 5 illustrate the various working positions of control means shown in Fig. 1.

Fig. 6 is a detail of Fig. 1 on an enlarged scale.

Figs. 7 and 8 illustrate enlarged representations of two chisel points constructed in accordance with the invention.

Figure 1:
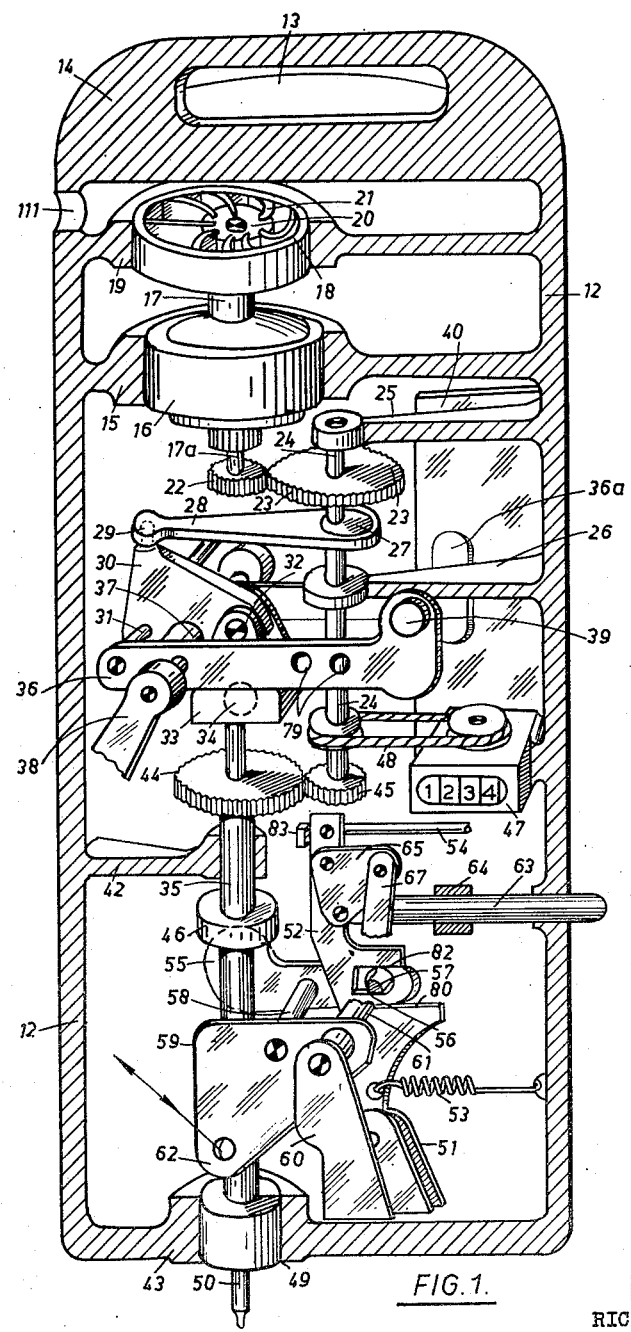
Fig. 1 represents a longitudinal section through a hardness testing and measuring device in accordance with the invention with its working parts being shown in perspective.
Figure 9:
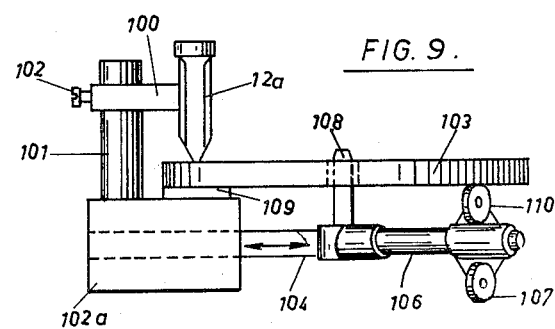
Fig. 9 shows in side elevation a stand for the attachment thereto of a device in accordance with Fig. 1 and of a work piece to be tested.

Referring to the drawings in detail, and to Fig. 1 in particular, the device embodying this invention includes a housing 12 of elongated shape which is closed at its top by a lid 14 formed with a handle 13. Within this housing, in a hub 15, is arranged an electric motor 16 by means of which movement is imparted to the various operating parts of the device. The motor shaft 17 protrudes vertically from the motor and at its top is arranged to drive an air compressor 18. The air compressor 18 may consist of a rotary pump 20 which is held in a hub 19, and has rotary blades 21 connected to the shaft 17 at the upper end thereof. The blades of this air compressor are preferably made of flexible material.

At its bottom end the shaft 17 is provided with a reduced diameter portion 17a to which a pinion 22 secured for rotating the driving or main shaft 24 of the device through meshing engagement with a gear wheel 23 on the latter. The shaft 24 is journaled in the bearings 25 and 26. Fastened to the shaft 24 is an eccentric 27 which is universally connected, for example by means of a suitable ball bearing (not shown), to a connecting rod 28. Provided at the free end of this rod 28 is a ball socket joint 29 by means of which it is in universal connection with a bell crank lever 30. This bell crank lever is arranged to rock on a pivot pin 31 and is connected at its other end by a pin 32 with a forked head 33 which, in turn, is connected by a ball socket joint 34 with a tool holder 35.

The pivot pin 31 of the bell crank lever 30 is mounted at one end of a balance beam, which consists of two identical members 36 and 36a arranged at the opposite sides of the bell crank lever 30 and rockably supported on a shaft 37, which is journaled in bearing arms 38. At their free ends the beams 36 and 36a are provided with tabs or pads 39 of sound absorbing material, such as felt for example, each adapted to slidably cooperate with a guide surface of a related guide wall 40 arranged in the housing 12 of the device. Extending upwardly from each of the free ends of the balance beams 36, 36a is a toothed rack 41 (Fig. 2) which will be hereinafter described in detail and which is omitted from Fig. 1 so as to avoid confusion with respect to the part illustrated therein.

The tool holder 35, a chisel holder in the present example, is slidably and rotatably journaled in hub-shaped bearings 42 and 43 within the housing 12. Near its upper end, the tool holder 35 is provided with a gear wheel 44 which is in engagement with a pinion 45 on the driving shaft 24, while somewhere about its central portion the tool holder carries a roller 46 adapted to cooperate with a cut-off switch assembly for the driving motor. There is further provided in the housing a counting mechanism 47 which is driven from the main shaft by means of a cord and pulley transmission 48. At its lower extremity the tool holder 35 is provided with a cap nut 49 for the attachment of a tool, such as the chisel 50 for example, and said cap nut also serves as a bearing for the tool holder 35 in the hub 43.

The aforementioned cut-off switch assembly consists of a switch lever 52 which is pivotally mounted on a bracket 51 near the bottom of the housing and acted upon by a spring 53. At its upper end the lever 52 carries a rod 54 for the actuation of the switch which is shown in Fig. 6. Movement is imparted to the switch lever 52 by means of a pivotally arranged locking lever 55. Both the switch lever 52 and the locking lever 55 are provided with knife-edged abutments 56 and 57, whose mutually cooperating positions are illustrated in Figs. 3 to 5. The locking lever 55 is rockably supported on a shaft 58 carried by an adjusting lever 59 which, in turn, rocks on a pin 61 carried by a bracket 60. The arrangement is such that the axis of the pin 61 coincides with the edge of the abutment 56 of the lever 52, so that the adjusting lever 59 can be pivoted on its pin 61 about the edge of abutment 56 by a movement imparted to the arm 62 thereof and the locking lever 55 will follow such movement. The free end of lever 55 cooperates with the abutment collar or roller 46 on the tool holder 35. For starting the device after a previous automatic stop, a push button or plunger 63 extends through the wall of the housing 12 and has a bar-shaped continuation guided in a bearing 64. The inner end of plunger 63 is pivotally connected to a bell crank lever 65 which is pivoted on the switch lever 52 and provided with links 67 which are connected to the locking lever 55, or the knife-edged abutment 57 thereof. In order to prevent crowding of the drawings all parts of the above described cut-off switch assembly are represented only singly, while in practice they may be duplicated. This more especially refers to the parts 65, 67, 55 and 59 which, as already described, are symmetrically positioned in relation to the switch lever 52.

Referring to Fig. 2 it will be seen that the toothed rack 41 on the balance beam 36, which has already been referred to, cooperates with a toothed segment 68, which is acted upon to move in a counter-clockwise direction by a convolute spring 69 so that the balance beam 36 is constantly subjected to a force tending to move the related end of the beam downwardly in the direction indicated by the arrow 70. The toothed segment 68 has the formation of an Archimedean spiral which causes the force acting in the direction 70 to be of a constantly uniform magnitude, which means that, as the force exerted by the spring increases or decreases, the moment arm of the segment 68 in mesh with rack 41 varies in the opposite direction so that the downward, spring generated force on the beam 36 is constant, even though the latter is displaced in response to the penetration of the tool 50 into the material being tested. It is to be understood that each of the beams 36 and 36a may have a spring loading device associated therewith similar to that described in connection with beam 36.

Fig. 6 illustrates the electric switch which is preferably used in the device shown in Fig. 1 and which comprises the two contact plates 71 and 72 fixed to a lug 73 of housing 12 and connected to the leads 74 from the motor 16. The switch operating rod 54 which is carried by the switch lever 52 is passed through an aperture 56 in the contact plate 71 and joined to the contact plate 72 as by means of a rivet 75. The arrangement of the two contact plates is such that in their electrically connected position, as illustrated, the two contacts 77 are closed and the motor 16 is energized. When the above described cut-off switch assembly is operated by means of the collar 46 on the tool holder 35, the connecting bar 54 moves outwardly and the two contacts 77 become separated.

In the hardness measuring and testing device as hereinbefore described two movable masses are coupled to each other so as to wholly or partly compensate their weight during their movement in order to enable the use of the device in any straight or inclined working position that may be required. One of these masses (the term "mass" must here be interpreted to mean "weight") is constituted by the reciprocating and rotatable tool holder 35 and the other by the balance beams 36 and 36a, which masses are mutually connected by the forked head 33 and one arm of the bell crank lever 30. The force by which the tool, during its operation, is caused to advance in its direction of penetration into the material, is produced by the weight of the tool holder 35, the spring arrangement such as illustrated in Fig. 2, and the beams 36 and 36a. Spaced apertures, such as 79, may be provided in the balance beams 36, 36a in which additional weights may be applied if this should be required for a better compensation of the masses.

The eccentric 27 on the driving shaft 24, the connecting rod 28 and the bell crank lever 30, which is connected to the tool holder by the forked head 33, constitute the transmission by means of which the rotations of the driving shaft 24, are transformed into reciprocating movements of the tool holder. The pinion 45 on the driving shaft, which is in engagement with the gear wheel 44 on the tool holder, forms the transmission by means of which the rotary movement of the driving shaft 24 is transmitted to the tool holder and by means of which the chisel is caused to perform a constant rotary movement. Instead of a continuous rotation it is also possible to transfer to the tool holder, or to the tool, an intermittent rotary movement, as by the interposition at a suitable place, of a separable clutch, by means of which the tool may be angularly displaced about its longitudinal axis only when it is disposed either at one end or the other end of its reciprocating travel, or when it is disposed at each of the opposite ends of its reciprocating travel if the latter should be found convenient.

The mode of operation of the device described and illustrated is as follows: In the "ON"-position of the switch shown in Fig. 6, the motor 16 drives the main shaft 24 through the gears 22 and 23. This effects both a reciprocatory movement of the tool holder 35, and therewith of the tool 50, through the parts 27, 28 and 30, and a rotary movement of the tool holder and the tool through the gears 44, 45. During these movements the counting mechanism 47 is actuated by the shaft 24, and the tool is also loaded and caused gradually to penetrate into the material to be tested and to continue in this direction by the combined action of the weight of beams 36 and 36a and by the spring means illustrated in Fig. 2. It will be seen that the beams 36 and 36a tend to swing in the clockwise direction, as viewed in Fig. 1, about their supporting pivot 37, while the bellcrank 30 rocks about the pivot pin 31 carried by the beams. Thus, the beams 36 and 36a do not follow the rocking of the bellcrank 30, but rather act upwardly on the latter's pivot 31 to provide a constant downward force or load on the tool holder 35. Further, the mass of the beams 36 and 36a is established in relation to the mass of the tool holder 35, by proper selection of the weights fitted in the apertures 79 of the beams, so that, during the reciprocation of the tool holder, the reactions transmitted through the bell crank 30 and its pivot 31 to the beams 36 and 36a are substantially compensated, and the dampening pads 39, in slidable contact with the guide walls 40, assist in resisting the reciprocation of the beams. As the tool 50 progressively penetrates into the material being tested, the tool holder is reciprocated between limits which are displaced in the downward direction, as viewed in Fig. 1, and this is accompanied by the progressive angular movement of beams 36 and 36a in the clockwise direction. As previously noted, the spring generated forces applied by the arrangement of Fig. 2 on the beams 36 and 36a remain constant as the beams are angularly displaced so that the load on the tool holder 35 and the tool 50 is constant during the operation of the device, that is, during the penetration of the tool into the material being tested to a predetermined depth.

In the example of the device just described the calculation of the work required to produce a particular penetration of the tool into the material to be tested is effected by measuring, as by counting for example, the number of strokes performed during penetration to a predetermined depth. The depth of penetration is maintained constant by the fact that the driving motor becomes disconnected by the actuation of the electric cut-off in a predetermined position of the tool. This occurs each time the abutment collar 46 strikes against the free end of the blocking lever 55 during the downward stroke of the tool holder. The position of the locking lever prior to the cut-off is such that the knife-edged abutment 57 (Fig. 5) rests against the edge 80 of the switch lever 52 and thereby prevents the movement of the switch lever in the cut-off direction as indicated by the arrow 81. If it now occurs, as already mentioned, that the locking lever 55 is turned by the abutment collar 46 of the tool holder about its axis 58 in a counter-clockwise direction, the knife-edged abutment 57 will be raised until its edge becomes flush with the edge of the abutment 56 of the switch lever 52 (Fig. 3). The switch lever 52 is now free to be immediately moved in the direction indicated by the arrow 81 by means of its spring 53 and thereby opens the switch contact 77 (Fig. 6) to interrupt the associated circuit. The position of the parts will now be as shown in Fig. 4, and the limitation of the rocking movement of the locking lever 55 is effected by means of a further abutment 82 on the switch lever 52.

In order to set the device for any desired depth of penetration of the tool, the locking lever 55 may be turned about its axis 61 upwardly or downwardly and to any extent required by means of the adjusting lever 59. For this purpose the device is provided with suitable adjusting means which are not shown in the drawings. These means may, for instance, include an adjusting screw spindle, an eccentric, lever or the like, in connection with the arm 62 of the lever 59.

For resetting the cut-off switch assembly, the plunger 63 is pressed into the housing 12, which movement of the plunger at first turns the switch lever 52, through the action of the bell crank lever 65, in the opposite direction of the arrow 81, whereby the position of the parts as shown in Fig. 3 is reestablished. Upon further depression of the plunger 63, and since the movement of the switch lever 52 is limited by the stop 83, the link 67 is now moved downwardly by a rocking movement of the bell crank lever 65 and, therewith, the locking lever, or the knife-edged abutment 57, is returned into the position of Fig. 5. The switch is now in the "ON"-position and the device commences to work.

In Fig. 7 the working end of the tool 50, a chisel in this case, is shown on an enlarged scale. The chisel consists of a cylindrical shaft 84 which is provided at both sides with flattened faces 86 extending upwardly from its pounding surface 85, whereby the said pounding surface has an oblong, rectangular shape. The flattened faces may be of the kind usually employed in screw drivers for example. The advantage of this shape rests in that it makes it possible to also employ materials for the manufacture of the chisel other than steel, such as, for example, sintered Carborundum or the like, which are possessed of better wearing properties than steel. A further advantage rests in that the chisel can be most easily secured in the tool holder, and this condition is almost indispensable if accurate and consistent results are to be obtained.

Another formation of the chisel end is shown in Fig. 8, in which the body 84 of the chisel is also of cylindrical shape with flattened faces 86. The faces, in this case, are chamfered at an angle of preferably about 45 to 60°. In this way facettes 87 are formed on the pounding surface at the free end of the tool so that the latter may be kept extremely narrow (0.2 mm. for example). This has the advantage that in this way the central circular area in the test piece subjected to continuous pounding during the rotation of the tool is held to a minimum diameter. Such an area would mainly be subjected to pressure without the grain of the substance being broken up as should be the case. Such area, as will easily be understood, corresponds in its diameter approximately to the width of the chisel. If, now, the chisel is constructed in the manner as illustrated in Fig. 8, such pressure area will have a negligible diameter. On the contrary, the whole structure of the grain in the operating section of the chisel will become broken up, since the circular area is of relatively small diameter. So it is possible, in the manner just described, to obtain comparable values for the various materials to be tested.

Figure 10:
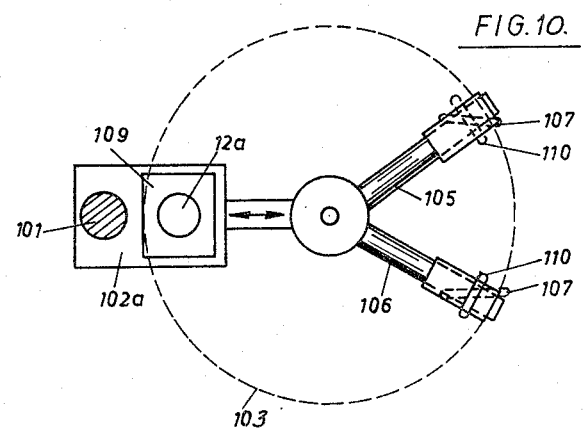
Fig. 10 is a plan view of the device illustrated in Fig. 9.

As already described, the device in accordance with the invention may also be used in connection with a stand, of which an example is shown in Figs. 10 and 11, in which the testing and measuring device 12a is removably suspended from an arm 100 extending from a column 101. The arm 100 is vertically displaceable on the column 101 and may be locked in position by a screw 102. The column 101 is fastened in a socket 102a, while a displaceable carrier supports the object to be tested, for example a grinding wheel 103. The carrier, for this purpose, is preferably composed of three star-like arranged arms 104, 105 and 106, of which the arm 104 is telescopically slidable in an opening of the socket 102a, while the other two arms 105 and 106 are provided with casters 107, by means of which they may run on a plate or table at the top of the stand. At the center of the carrier a pin 108 is provided for the reception, or centering, of the grind wheel 103. The latter may be supported, at one side, on a pressure plate 109 of the socket 102a in the vicinity of the hardness testing device 12a, and at the other side on rollers 110 arranged on the arms 105 and 106. The rollers 110 facilitate turning of the grinding wheel so that the latter may be tested at several places on a circle which is concentric to the axis of the wheel.

The compressor 18 driven by the motor shaft 17 which has been mentioned in connection with Fig. 1 of the drawings, draws air from outside the housing 12 through the opening 111 in the latter, compresses it and forces the compressed air through the housing and the clearance, or a slot, between the bearing 43 and the guide 49 of the tool holder to blow away the chiselling dust and thereby prevent the entry of such dust into the housing of the device.

What we claim is:

1. A hardness testing device for ceramic and artificially compounded materials comprising a tool holder movable longitudinally and rotatable about its longitudinal axis, a tool carried by said holder for penetration into the material to be tested, an electric driving motor, an electric circuit for energizing said motor, transmission means driven by said motor effecting rotation of said holder about its longitudinal axis and simultaneously effecting longitudinal reciprocation of said holder through a stroke of predetermined length, loading means continuously applying a load to said holder in the direction of the penetration of said tool into the material being tested so that, as said holder is rotated and reciprocated, said tool penetrates into the material being tested, means for damping vibrations transmitted to said loading means, normally closed switch means interposed in said circuit, and switch operating means opening said switch means automatically in response to a predetermined penetration of said tool into the material being tested to then halt the operation of said motor.

2. A hardness testing device according to claim 1; further comprising means for indicating the revolutions and strokes of said holder prior to the opening of said switch means so that the relative work required to effect the predetermined penetration of the material being tested can be calculated.

3. A hardness testing device according to claim 1; wherein said loading means includes a scale balance-like device which is independent of the motion of said transmission means and which applies a constant load to said holder in said direction of penetration of the tool.

4. A hardness testing device according to claim 1; wherein said transmission means includes a drive shaft driven from said motor, an eccentric on said drive shaft, a bell-crank lever connected at one end to said tool holder, a connecting rod extending from said eccentric for converting the rotation of said drive shaft into a reciprocating movement, and universal connecting means between said rod and the other end of said bell-crank lever; and wherein said loading means includes at least one balance beam mounted on a fixed pivot, said bell-crank lever being rockably mounted on said balance beam adjacent one end of the latter, and means urging said balance beam to swing about its fixed pivot in the direction applying said load to the holder through said bell-crank lever.

5. A hardness testing device according to claim 4; wherein said means urging the balance beam to swing about its fixed pivot includes weights removably secured on said balance beam.

6. A hardness testing device according to claim 4; wherein said vibration damping means includes a fixed guide wall extending parallel to the plane of swinging of said balance beam about its fixed pivot, and at least one member having a high coefficient of friction mounted on said balance beam and slidably engaging said guide wall.

7. A hardness testing device according to claim 4; wherein said means urging the balance beam to swing about its fixed pivot includes a spring, and coupling means between said spring and balance beam operative to apply a continuous spring generated force to the balance beam as the latter is angularly displaced about its fixed pivot during penetration of the tool into the material being tested.

8. A hardness testing device according to claim 7; wherein said coupling means includes a toothed rack on said balance beam, and a toothed segment meshing with said rack and angularly urged in one direction by said spring, said toothed segment being in the form of an Archimedean spiral so that, as said spring relaxes in accordance with the angular displacement of said segment, the moment arm of the force applied to said rack increases thereby to maintain the spring generated force applied to said balance beam at a constant value.

9. A hardness testing device according to claim 1; wherein said tool includes a cylindrical shank secured in said holder, the free end portion of said shank having flattened surfaces at the opposite sides thereof to define an operating end of substantially rectangular cross-section.

10. A hardness testing device according to claim 9; wherein the free ends of said flattened surfaces are bevelled at an angle of approximately 45° to 60° thereby to further decrease the width of said operating end of the tool.

11. A hardness testing device according to claim 1; wherein said switch means includes normally engaged switch contacts, and said switch operating means includes a rockable switch lever, means connected to said switch lever and operative to separate said contacts in response to rocking of said switch lever in a contact opening direction, spring means yieldably urging said switch lever in said contact opening direction, a pivotally mounted locking lever, an abutment on said tool holder engageable with said locking lever when said tool has penetrated into the material being tested to said predetermined extent to then rock said locking lever in one direction, and cooperating knife-edged abutments on said locking lever and switch lever to normally prevent rocking of the latter in the contact opening direction, said cooperating abutments being disengaged by rocking of said locking lever in said one direction thereby to free said switch lever for opening of said contacts.

12. A hardness testing device according to claim 11; wherein said switch operating means further includes a supporting bell-crank lever, means pivotally carrying said supporting bell-crank lever for rocking about an axis coinciding with the knife-edged abutment on said switch lever when the latter is rocked in said contact opening direction, and means for angularly adjusting said supporting bell-crank lever about said axis of the latter, said locking lever being pivotally mounted on said supporting bell-crank lever for rocking relative to the latter about an axis displaced from said knife-edged abutment on the locking lever and the path of said abutment on the tool holder so that angular adjustment of said supporting bell-crank lever serves to vary the extent of penetration of the tool into the material being tested that is necessary to open said switch contacts.

13. A hardness testing device according to claim 12; wherein said switch operating means further includes a manually operable plunger for restoring said switch lever and locking lever to the normal positions thereof corresponding to the engaged condition of said contacts, a rockable bell-crank pivotally mounted on said switch lever and connected to said plunger, and links pivotally connecting said bell-crank to said locking lever so that movement of said plunger in one direction first rocks said switch lever in the direction opposed by said spring and then rocks said locking lever to again engage said knife-edged abutments on the locking and switch levers.

14. A hardness testing device according to claim 1; further comprising a housing from which said tool projects, a stand, means for detachably connecting said housing to the stand, a work-piece holder, and means for slidably and turnably mounting said work-piece holder on said stand.

15. A hardness testing device according to claim 1; further comprising a housing from which said tool projects, and a stand including an upstanding column on which said housing is adjustably mounted, a carrier having star-like arranged arms one of which is adjustably slidable through the base of said column, a support plate for the material to be tested disposed on said base under said tool, and roller guides on the others of said arms to support the material to be tested.

16. A hardness testing device according to claim 15; a centering pin for the material to be tested extending upwardly from the junction of said arms.

References Cited in the file of this patent

UNITED STATES PATENTS

| | | |
|---|---|---|
| 1,283,362 | Tone | Oct. 29, 1918 |
| 1,681,070 | Uschmann | Aug. 14, 1928 |
| 1,902,765 | Deitsch | Mar. 21, 1933 |
| 1,991,238 | Willey | Feb. 12, 1935 |
| 2,054,787 | Beavers et al. | Sept. 22, 1936 |
| 2,330,578 | Harris | Sept. 28, 1943 |

FOREIGN PATENTS

| | | |
|---|---|---|
| 858,147 | Germany | Dec. 4, 1952 |